US011517158B2

(12) United States Patent
Bayha et al.

(10) Patent No.: US 11,517,158 B2
(45) Date of Patent: Dec. 6, 2022

(54) VACUUM CLEANING DEVICE

(71) Applicant: Robert Bosch GmbH, Stuttgart (DE)

(72) Inventors: Tobias Bayha, Walddorfhaeslach (DE); Charlotte Meiser, Kernen Im Remstal (DE); Hardy Schmid, Stuttgart (DE); Jan-Simon Blind, Steinenbronn (DE); Joerg Kaiser, Markgroeningen (DE); Michael Wall, Stuttgart (DE); Ralf Maier, Koengen (DE); Rudi Habermann, Stuttgart (DE); Simon Schart, Aichelberg (DE)

(73) Assignee: Robert Bosch GmbH, Stuttgart (DE)

( * ) Notice: Subject to any disclaimer, the term of this patent is extended or adjusted under 35 U.S.C. 154(b) by 130 days.

(21) Appl. No.: 16/565,085

(22) Filed: Sep. 9, 2019

(65) Prior Publication Data
US 2020/0077852 A1 Mar. 12, 2020

(30) Foreign Application Priority Data

Sep. 10, 2018 (DE) ...................... 10 2018 215 308.6

(51) Int. Cl.
*A47L 7/00* (2006.01)
*A47L 9/10* (2006.01)

(52) U.S. Cl.
CPC ............. *A47L 7/0095* (2013.01); *A47L 9/106* (2013.01)

(58) Field of Classification Search
CPC ........ A47L 7/0095; A47L 7/009; A47L 9/106; A47L 9/20; A47L 9/1409; A47L 9/1427; A47L 9/1436; A47L 9/1463; A47L 9/10–1418; B23Q 11/0042; B23Q 11/0046; B23Q 11/006; B23Q 11/0071

USPC .......................................................... 15/352
See application file for complete search history.

(56) References Cited

U.S. PATENT DOCUMENTS

| 5,704,956 | A  | * | 1/1998 | Loveless | ................ | B01D 46/76 55/482 |
| 6,949,130 | B1 | * | 9/2005 | Grey | ...................... | B01D 46/76 55/459.1 |
| 7,497,886 | B2 | * | 3/2009 | Walker | .................... | B04C 5/187 451/453 |
| 7,644,469 | B2 |   | 1/2010 | Beers et al. | | |
| 7,736,406 | B2 | * | 6/2010 | Kuroki | .................... | A47L 9/122 55/300 |
| 8,424,154 | B2 | * | 4/2013 | Beskow | .................... | A47L 9/20 15/352 |

(Continued)

FOREIGN PATENT DOCUMENTS

| CN | 107440602 A | * | 12/2017 | ............... A47L 5/12 |
| CN | 108926289 A | * | 12/2018 | ........... A47L 9/0081 |

(Continued)

*Primary Examiner* — Joseph J Hail
*Assistant Examiner* — Jonathan R Zaworski
(74) *Attorney, Agent, or Firm* — Maginot, Moore & Beck LLP

(57) ABSTRACT

A dust extraction device for a hand-held power tool includes a housing, a mechanical interface for releasably connecting the dust extraction device to the hand-held power tool, a dust-collecting chamber which is connected to a filter unit, and a filter-cleaning unit. The filter-cleaning unit has an impact element which is mounted moveably in and/or on the housing of the dust extraction device. The impact element is designed to act upon the filter unit directly with an impact-like force.

15 Claims, 8 Drawing Sheets

(56) References Cited

U.S. PATENT DOCUMENTS

| | | | |
|---|---|---|---|
| 8,918,953 B2* | 12/2014 | Sjoberg | A47L 9/20 15/352 |
| 10,219,666 B2* | 3/2019 | Kim | A47L 5/28 |
| 2006/0107633 A1 | 5/2006 | Walker | |
| 2010/0116261 A1 | 5/2010 | Fairweather et al. | |
| 2013/0213683 A1* | 8/2013 | Brewster | B23Q 11/0046 173/198 |
| 2014/0215752 A1* | 8/2014 | Loveless | A47L 5/362 15/352 |
| 2016/0016270 A1* | 1/2016 | Batres | B01D 46/521 83/100 |
| 2018/0199794 A1* | 7/2018 | Nemetz | A47L 9/20 |
| 2020/0198024 A1* | 6/2020 | Yoshikane | B25F 5/00 |

FOREIGN PATENT DOCUMENTS

| | | | | |
|---|---|---|---|---|
| CN | 109394070 A * | 3/2019 | | A47L 9/10 |
| DE | 600 05 391 T2 | 8/2004 | | |
| DE | 10 2015 217 825 A1 | 3/2017 | | |
| DE | 10 2017 203 218 A1 | 8/2018 | | |
| EP | 1464266 A1 * | 10/2004 | | A47L 9/20 |
| JP | 2006333925 A * | 12/2006 | | |
| JP | 5439292 B2 * | 3/2014 | | |

* cited by examiner

VACUUM CLEANING DEVICE

This application claims priority under 35 U.S.C. § 119 to application no. DE 10 2018 215 308.6, filed on Sep. 10, 2018 in Germany, the disclosure of which is incorporated herein by reference in its entirety.

BACKGROUND

U.S. Pat. No. 7,644,469 B2 describes a vacuum cleaner with a cleaning device for cleaning a filter, wherein the cleaning device is driven by an electric motor.

SUMMARY

The disclosure relates to a dust extraction device for a hand-held power tool, with a housing, with a mechanical interface for releasably connecting the dust extraction device to the hand-held power tool, with a dust-collecting chamber which is connected to a filter unit, and with a filter-cleaning unit, wherein the filter-cleaning unit has an impact element which is mounted moveably in and/or on the housing of the dust extraction device. It is proposed that the impact element is designed to act upon the filter unit directly with an impact-like force. A high suction-extraction power for a relatively long period of time can advantageously thereby be realized.

The dust extraction device is preferably designed as an accessory for the hand-held power tool, wherein the hand-held power tool is also capable of being used without the accessory. The dust extraction device is designed in particular for the suction-extraction of dust particles, for example drilling dust/sanding dust/sawing dust during machining of a workpiece by a hand-held power tool. In particular, the dust extraction device has an air channel through which an air stream is conducted during operation. The air stream can be produced in particular by means of a blower unit. The blower unit can be arranged in the dust extraction device, in the hand-held power tool or in an external vacuum cleaner. The blower unit comprises at least one fan element which can be designed by way of example as a radial ventilator or as an axial ventilator.

The hand-held power tool can be designed by way of example as a hammer drill, as a drill, as a percussion hammer, as a percussion drill, as an angle grinder, as a sander, as a reciprocating saw, etc. wherein a shared feature of said power tools is that drilling dust/sanding dust/sawing dust arises during the operation. The hand-held power tool can be designed as a mains unit or as a battery powered unit.

The mechanical interface of the dust extraction device is designed in particular for the force-fitting and/or form-fitting connection of the dust extraction device to the hand-held power tool, in particular the housing of the dust extraction device to a housing of the hand-held power tool. In connection with this application, a "releasable connection" is intended to be understood as meaning in particular a connection which is releasable without a tool. The mechanical interface has in particular at least one guide element for guiding the dust extraction device during the connection to the hand-held power tool or during the release from the hand-held power tool. The guide element is preferably designed as a guide rail. In addition, it is conceivable that the mechanical interface has a locking unit for locking the dust extraction device and the hand-held power tool. The locking unit preferably has at least one locking element and at least one actuating element for actuating the locking unit. In addition it is likewise conceivable that the dust extraction device has an electrical interface via which the dust extraction device, for example, can be supplied with power, can exchange information or can be controlled.

Alternatively, it is likewise conceivable, however, for the dust extraction device to be designed as part of the hand-held power tool or to be integrated in the hand-held power tool and therefore to be non-releasably connected thereto.

The dust-collecting chamber is designed in particular for receiving the dust particles produced during the operation of the hand-held power tool. The dust-collecting chamber is arranged in particular in such a manner that the air stream is at least partially conducted through the dust-collecting chamber. In particular, the dust-collecting chamber has a dust-collecting-chamber housing. The dust-collecting-chamber housing can be integrated in the housing of the dust extraction device or alternatively can be designed to be releasably connectable thereto. The dust-collecting chamber has an input via which the air stream enters the dust-collecting chamber and an output via which the air stream leaves the dust-collecting chamber. The input and the output of the dust-collecting chamber are preferably formed separately from each other. Furthermore, it is conceivable for the dust-collecting chamber to have an emptying opening which is provided for emptying the dust-collecting chamber. The emptying opening is preferably designed to be closeable, for example closeable by means of an emptying flap.

The filter unit is provided for filtering the dust particles out of the air stream. The filter unit is arranged in particular in the region of the output of the dust-collecting chamber. The filter unit is connectable, in particular releasably, to the dust extraction device, preferably releasably to the dust-collecting chamber of the dust extraction device. The filter unit has at least one filter element. The filter element can be composed, for example, of a felt, a non-woven material, a woven fabric, paper or the like. The filter element is designed in particular as a microfilter or a fine dust filter, preferably as an HEPA filter.

An impact element which acts upon the filter unit "directly" is intended to be understood as meaning in particular an impact element which touches the filter unit, preferably the filter element, during the action thereupon. Alternatively, it would also be conceivable for the impact element to act upon the filter unit indirectly by means of an impact-like force, wherein, during the indirect action, the impact element acts upon a housing part connected to the filter unit, for example the housing of the dust extraction device or the dust-collecting chamber housing.

Furthermore, it is proposed that the filter-cleaning unit, in particular the impact element of the filter-cleaning unit, lies against the filter unit, preferably against a filter element of the filter unit. In particular, in an inoperative position, the impact element lies against the filter-cleaning unit, preferably against the filter element. Alternatively, it is likewise conceivable that, in the inoperative position, the impact element hangs freely above the filter unit, in particular above the filter element.

Furthermore, it is proposed that the filter-cleaning unit has a resetting element which acts upon the impact element with a force in the direction of the filter unit. The resetting element is designed in particular as a spring element. The spring element can be designed, for example, as an annular spring, as a helical spring, as a spiral spring, as a wrap spring, etc. In particular, the impact element is arranged between the filter unit and the resetting element.

In addition, it is proposed that the filter-cleaning unit has an actuating element which is coupled mechanically to the impact element. In connection with this application, two components or assemblies which are coupled mechanically to each other is intended to be understood as meaning in particular that the components or the assemblies are connected to each other in such a manner that a movement of the one component brings about or causes a movement of the other component. In particular, the actuating element is coupled mechanically to the impact element in such a manner that, when the actuating element is actuated, the impact element at least partially moves away from the filter unit. The actuation of the actuating element preferably takes place counter to a dynamic effect of the spring element; in particular, the impact element and the actuating element are moveable relative to each other, wherein an actuating axis of the actuating element and a movement axis of the impact element are parallel. The actuating axis and the movement axis can be designed as an axis of rotation or as a longitudinal axis along which a component moves. It is likewise conceivable for the actuating axis and the movement axis to intersect, preferably to be arranged substantially perpendicularly to each other.

Furthermore, it is proposed that the actuating element is designed for manual actuation and has an operator control surface. The operator control surface is preferably arranged on an outer surface of the housing of the dust extraction device. In particular, the operator control surface is arranged laterally. Particularly convenient operation of the filter-cleaning unit can advantageously thereby be realized.

Furthermore, it is proposed that the impact element has at least one air transport channel. An arrangement of the impact element in the air channel of the dust extraction device can advantageously thereby be realized without the air stream being too greatly affected. The air transport channel is designed in particular as a recess in the impact element.

In addition, it is proposed that the actuating element is designed for automatic actuation. The operation of the filter-cleaning unit can advantageously thereby be at least partially, in particular completely, automated. In particular, the actuating element is designed in such a manner that the automatic actuation takes place while the dust extraction device is connected to the hand-held power tool or during the drilling operation. For example, it is conceivable for the actuating element to be assigned to the dust extraction device and to have an actuating region which is arranged in such a manner that, during connection to the hand-held power tool, said actuating region comes into engagement with the housing of the hand-held power tool or with a corresponding actuating region and is thereby actuated. It is likewise conceivable for an actuating region of the actuating element to be coupled to an electrically activatable actuator. The actuator can be activated, for example, via an operator control element on the dust extraction device or on the hand-held power tool. Alternatively, it would also be conceivable for the actuator to be activated at pre-programmed intervals or depending on a suction power of the dust extraction device.

Furthermore, it is proposed that the filter unit has a filter frame, wherein the filter frame is connectable to the dust-collecting chamber. The connection between the filter frame and the dust-collecting chamber is preferably formed releasably, in particular via a force-fitting and/or form-fitting connection. The filter frame can be formed from a plastic. In particular, the filter frame is formed from a hard plastic. The filter frame is preferably formed from a soft plastic, preferably from TPE. In this connection, a soft plastics material is intended to be understood as meaning in particular a flexible plastic, for example soft PVC, polyolefins or polyethylene.

Furthermore, it is proposed that the filter element has filter pockets which are formed triangularly. Greater effectiveness of cleaning the filter can advantageously thereby be realized. The filter element comprises at least two filter pockets which extend substantially in the same direction. As a result of production, the filter pockets of the filter element may be designed to be open laterally. In this case, the filter unit preferably has at least one closure element per open side in order to seal said sides. The closure element can be composed of a plastic and is preferably formed in one piece with the filter frame.

In addition, it is proposed that the filter unit has an elastic sealing element which is arranged between the dust-collecting chamber and/or the housing of the dust extraction device, wherein the sealing element is compressed in the mounted state. As a result, particularly effective sealing can advantageously be realized. In particular, the sealing element is partially compressed in the mounted state and in the inoperative position of the impact element. In particular, the sealing element is arranged in such a manner that the compression of the sealing element during the action upon the filter unit with an impact-like force by the impact element is increased or reduced. Sealing can advantageously thereby be realized even during the cleaning of the filter. The sealing element is preferably formed from a plastic, preferably from soft plastic. In particular, the sealing element and the filter frame are formed in one piece.

BRIEF DESCRIPTION OF THE DRAWINGS

Further advantages emerge from the description below of the drawings. The drawings, the description and the claims contain numerous features in combination. A person skilled in the art will expediently also consider the features individually and put them together to form meaningful further combinations. Reference signs of features of different embodiments of the disclosure that substantially correspond are provided with the same number and with a letter identifying the embodiment.

In the drawings.

DETAILED DESCRIPTION

Figure 1:
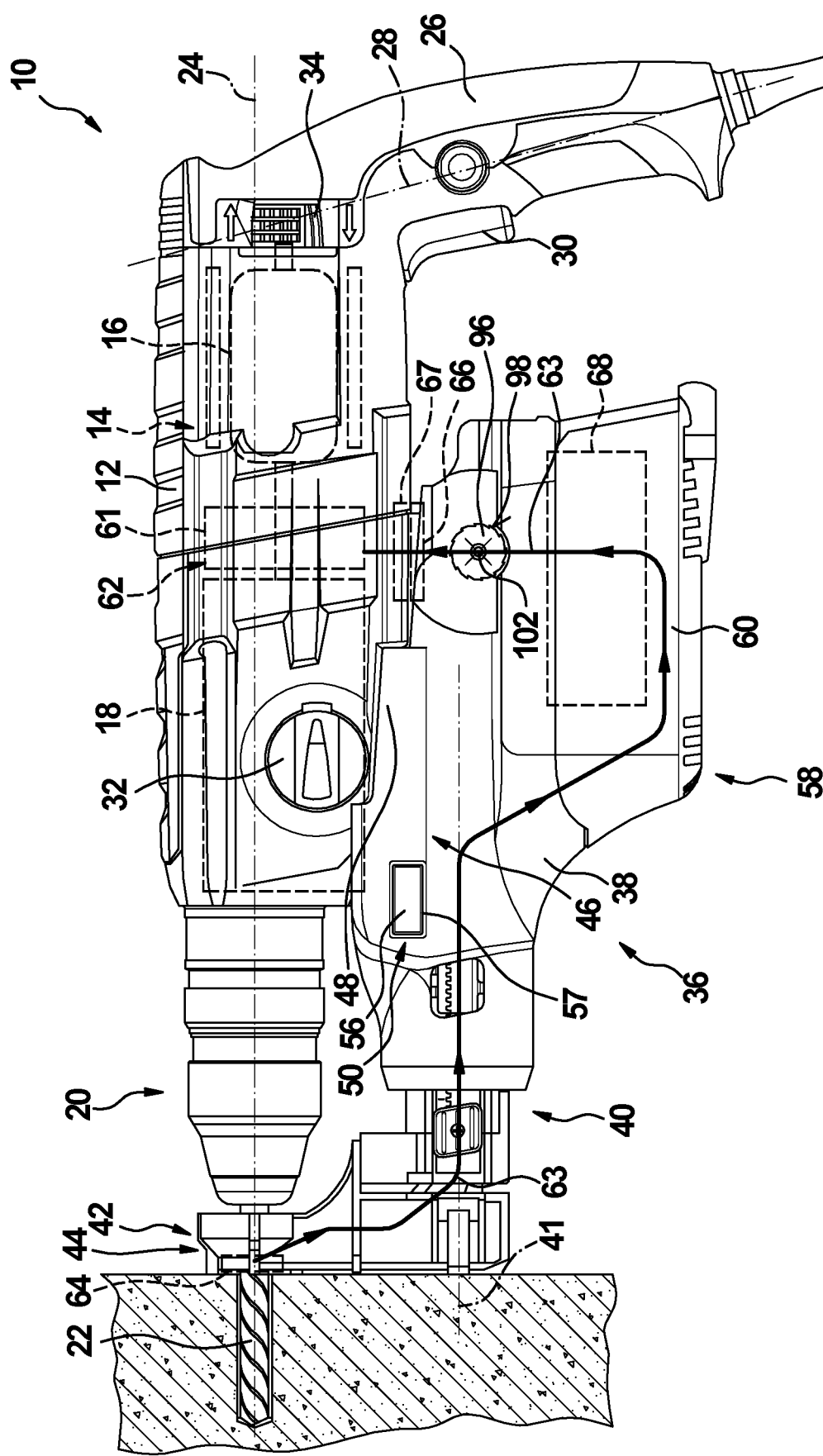
FIG. 1 shows a side view of a system consisting of a hand-held power tool and a dust extraction device.

FIG. 1 shows a hand-held power tool 10 in a side view. The hand-held power tool 10 is designed by way of example as a hammer drill. The hand-held power tool 10 has a housing 12 which is designed as an outer housing. The housing 12 of the hand-held power tool 10 has a pistol-shaped configuration. The housing 12 of the hand-held power tool 10 contains a drive unit 14, which comprises an electric motor 16, and a gearing unit 18, which includes a percussion mechanism, which is designed by way of example as a pneumatic percussion mechanism. A tool holder 20 in which an insertable tool 22 is releasably fastenable is arranged at a front end of the hand-held power tool 10. The insertable tool 22 is designed by way of example as a rock drill. The insertable tool 22 is drivable in a rotating manner about and/or in a linearly oscillating manner along a working axis 24. A handle 26 which extends along a handle axis 28 is arranged at the rear end of the hand-held power tool 10. The handle axis 28 is arranged substantially perpendicularly to the working axis 24. An operating switch 30 which is actuable manually and via which the hand-held power tool 10 can be switched on and off is arranged on the handle 26. In addition, an operating mode switch 32 and a direction of rotation switch 34 are arranged laterally on the housing 12 of the hand-held power tool 10. The operating mode switch 32 is designed for switching the operating mode, here between a drilling mode, a hammer drill mode and a chisel mode. The direction of rotation switch 34 is designed for switching a direction of rotation of the insertable tool 22. The operating mode switch 32 and the direction of rotation switch 34 are arranged on the same side of the housing 12 of the hand-held power tool 10.

Furthermore, a dust extraction device 36 is shown in a side view in FIG. 1. The dust extraction device 36 has a housing 38 which is designed as an outer housing. The dust extraction device 36 has a telescopic unit 40 which has a telescopic tube 39 and is mounted in a linearly moveable manner in the housing 38 of the dust extraction device 36. The movement of the telescopic unit 40 takes place along a telescopic axis 41 which, by way of example, is formed substantially parallel to the working axis 24 of the hand-held power tool 10.

A suction head 42 is arranged at the front end of the telescopic unit 40, which end faces away from the housing 38 of the dust extraction device 36. The suction head 42 is designed to be moveable relative to the housing 38 of the dust extraction device 36 via the telescopic unit 40. The suction head 42 has an insertable tool bushing 44. The insertable tool bushing 44 is, by way of example, of hollow-cylindrical design and extends substantially co-axially to the working axis 24 of the hand-held power tool 10. During the operation of the system consisting of hand-held power tool 10 and dust extraction device 36, the insertable tool 22 is guided through the insertable tool bushing 44. The telescopic unit 40 is shown in FIG. 1 in a retracted state in which the telescopic unit 40 is acted upon with a force by the suction head 42 lying against a workpiece.

The housing 38 of the dust extraction device 36 is connected to the hand-held power tool 10, in particular to the housing 12 of the hand-held power tool 10 via a mechanical interface 46. The mechanical interface 46 has two guide rails 48 which by way of example extend substantially parallel to the telescopic axis 41 or the working axis 24 of the hand-held power tool 10. The dust extraction device 36 is therefore designed such that it can be pushed onto the hand-held power tool 10 from the front. In addition, the mechanical interface 46 has a locking unit 50 for locking the dust extraction device 36 to the hand-held power tool 10. The locking unit 50 comprises a locking element 52 (see FIG. 2a) which projects out of the housing 38 of the dust extraction device 36 in the direction of the hand-held power tool 10. The locking element 52 is pretensioned in the direction of a locking position with the aid of a spring element 54 (see FIG. 2a) designed as a leg spring. The locking unit 50 has a manually actuable unlocking element 56. The unlocking element 56 is arranged in a lateral housing opening 57 of the housing 38 of the dust extraction device 36. The housing 38 of the dust extraction device 36 preferably has two opposite lateral housing openings 57 so that the unlocking element 56 is actuable from both sides. The unlocking element 56 is coupled mechanically to the locking element 52 in such a manner that, when the unlocking element 56 is actuated manually, the locking element 52 is moved from the locking position into an unlocking position, wherein, in the unlocking position, the dust extraction device 36 can be released from the hand-held power tool 10.

The dust extraction device 36 has a dust-collecting chamber 58 which is connected releasably to the housing 38 of the dust extraction device 36. The dust-collecting chamber 58 has a dust-collecting-chamber housing 60. The dust-collecting chamber 58 is arranged on a side of the dust extraction device 36 facing away from the mechanical interface 46.

During operation, a blower unit 62 produces an air stream which is provided for the suction extraction of dust particles at a working point of the insertable tool 22. The blower unit 62 is arranged by way of example in the housing 12 of the hand-held power tool 10. Alternatively it would also be conceivable for the blower unit 62 to be arranged in the housing 38 of the dust extraction device 36. The blower unit 62 has a fan 61 which is designed by way of example as a double fan and is provided for producing the air stream in the dust extraction device 36 and for cooling the electric motor 16. The fan 61 is connected to a motor shaft of the electric motor 16 for rotation with said motor shaft and is driven by the latter. Alternatively, it would also be conceivable for the blower unit 62 to be driven by a dedicated drive unit, for example an electric motor.

The air stream is conducted in the dust extraction device 36 through an air channel 63 which has a suction extraction opening 64, via which the air stream enters the air channel 63, and an output opening 66, via which the air stream leaves the dust extraction device 36. The suction extraction opening 64 is arranged in the region of the suction head 42, in particular in the region of the insertable tool bushing 44. The air stream is therefore sucked up via the suction extraction opening 64 in the region of the suction head 42 and is conducted via the air channel 63 through the telescopic tube 39 of the telescopic unit 40 into the dust-collecting chamber 58. A filter unit 68 which is designed for filtering the dust particles out of the air stream is arranged in the dust-collecting chamber 58. The air stream leaves the dust-collecting chamber 58 via the filter unit 68 and is conducted to the output opening 66 by means of an air-directing element 70. The hand-held power tool 10 has an air inlet 67. In the connected state, the output opening 66 of the dust extraction device 36 and the air inlet 67 are arranged in such a manner that the air stream is conducted directly from the output opening 66 into the air inlet 67 and is thereby conducted into the housing 12 of the hand-held power tool 10. In particular, the dust extraction device 36 and the hand-held power tool 10 lie against each other in the region of the output opening 66 or in the region of the air inlet 67. The air stream leaves the housing 12 of the hand-held power tool 10 via air outlets (not illustrated specifically).

Figure 2A:
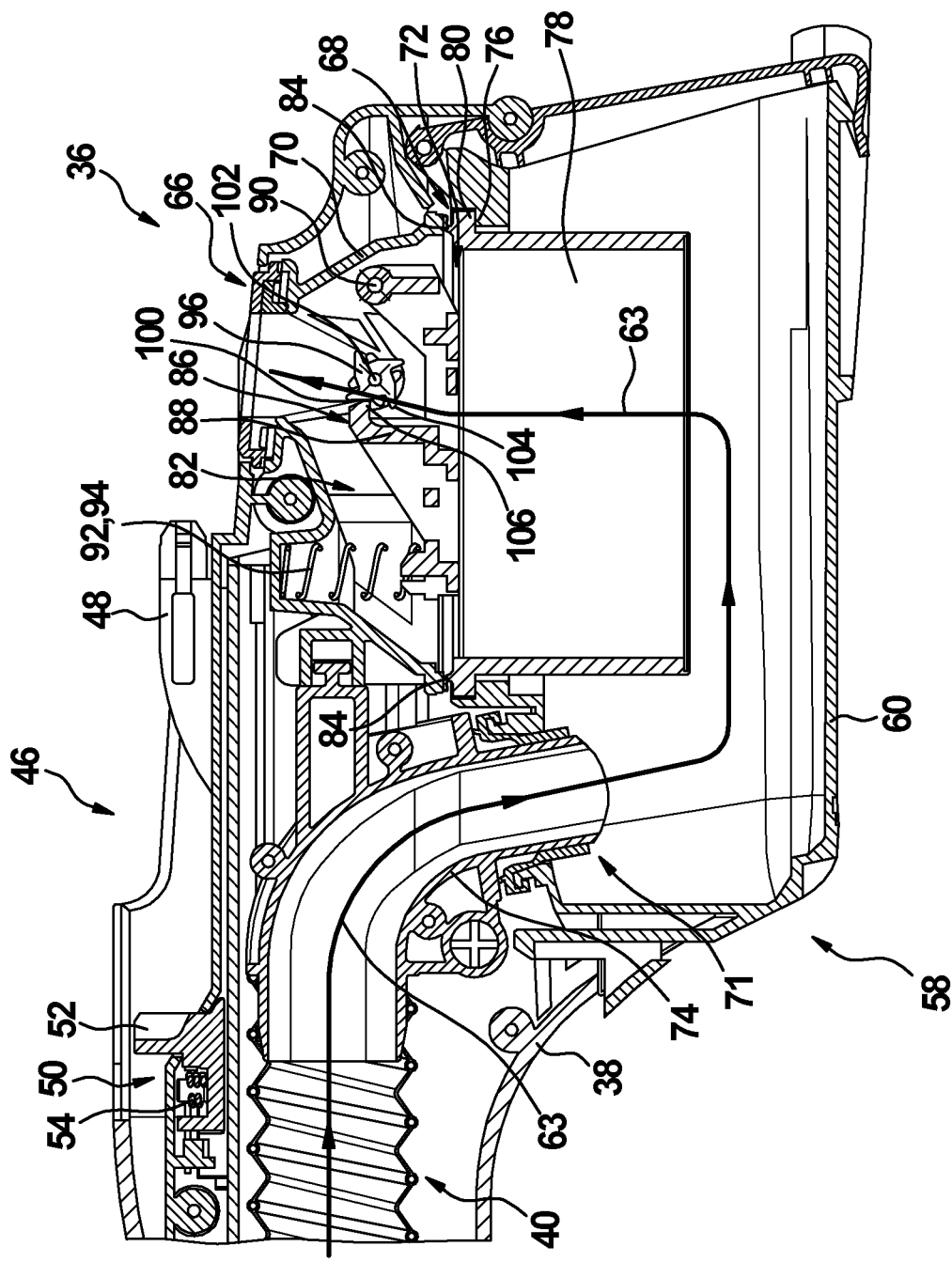
FIG. 2*a* shows a partial longitudinal section of the dust extraction device, wherein a filter-cleaning unit is in an inoperative position.

FIG. 2a shows a partial section through the dust extraction device 36. The dust-collecting chamber 58 has an input 71, via which the air stream enters the dust-collecting chamber 58, and an output 72, via which the air stream leaves the dust-collecting chamber 58. In the region of the input 71 of the dust-collecting chamber 58, the air stream is conducted out of the telescopic unit 40 into the dust-collecting chamber 58 by means of a curved tube 74 which partially projects into the dust-collecting chamber 58. In the region of the output 72, the dust-collecting chamber 58 has a filter holder 76 which is designed for holding the filter unit 68. The filter holder 76 is designed by way of example in such a manner that the filter unit 68 is releasably connectable to the dust-collecting chamber 58, in particular to the dust-collecting-chamber housing 60.

The filter unit 68 has a filter element 78 and a filter frame 80. The filter element 78 is designed by way of example as an HEPA filter. The filter frame 80 is held in a force-fitting manner in the filter holder 76. The filter unit 68 and the filter element 78 project into the dust-collecting chamber 58. In particular, the filter unit 68 is designed in a freely hanging manner, and therefore the filter unit 68 on its side facing away from the filter holder 76 does not lie against the dust-collecting-chamber housing 60 of the dust-collecting chamber 58.

In the direction of flow of the air stream behind the filter unit 68 and outside the dust-collecting chamber 58, the air stream is conducted via the chimney-like air-directing element 70 to the output opening 66 of the dust extraction device 36. The air-directing element 70 spans an air-directing region 82 which is substantially closed and conducts substantially the entire air stream entering through the filter unit 68 to the output opening 66. The volume of the air-directing region 82 is smaller than 50% of the volume of the housing 38, in particular smaller than 25% of the volume of the housing 38.

The air-directing element 70 lies against the filter unit 68. In particular, the air-directing element 70 lies against the filter unit 68 via a sealing element 84 so that it is not possible for part of the air stream to enter and/or exit in the contact region. The sealing element 84 is formed by way of example in one piece with the filter frame 80. The sealing element 84 has a protruding free end. The free end is arranged by way of example on a side facing away from the dust-collecting chamber 58. The sealing element 84 is designed by way of example as a sealing lip. In the shown and mounted state, the sealing element 84 is in a compressed state, and therefore the free end is bent or curved.

In order to ensure a consistently high filter power, the dust extraction device 36 has a filter-cleaning unit 86. The filter-cleaning unit 86 is arranged by way of example in the air channel 63. Alternatively, it is also conceivable for the filter-cleaning unit 86 to be arranged at a distance from the air channel 63. In particular, the filter-cleaning unit 86 is arranged in the air-directing region 82.

Figure 2B:
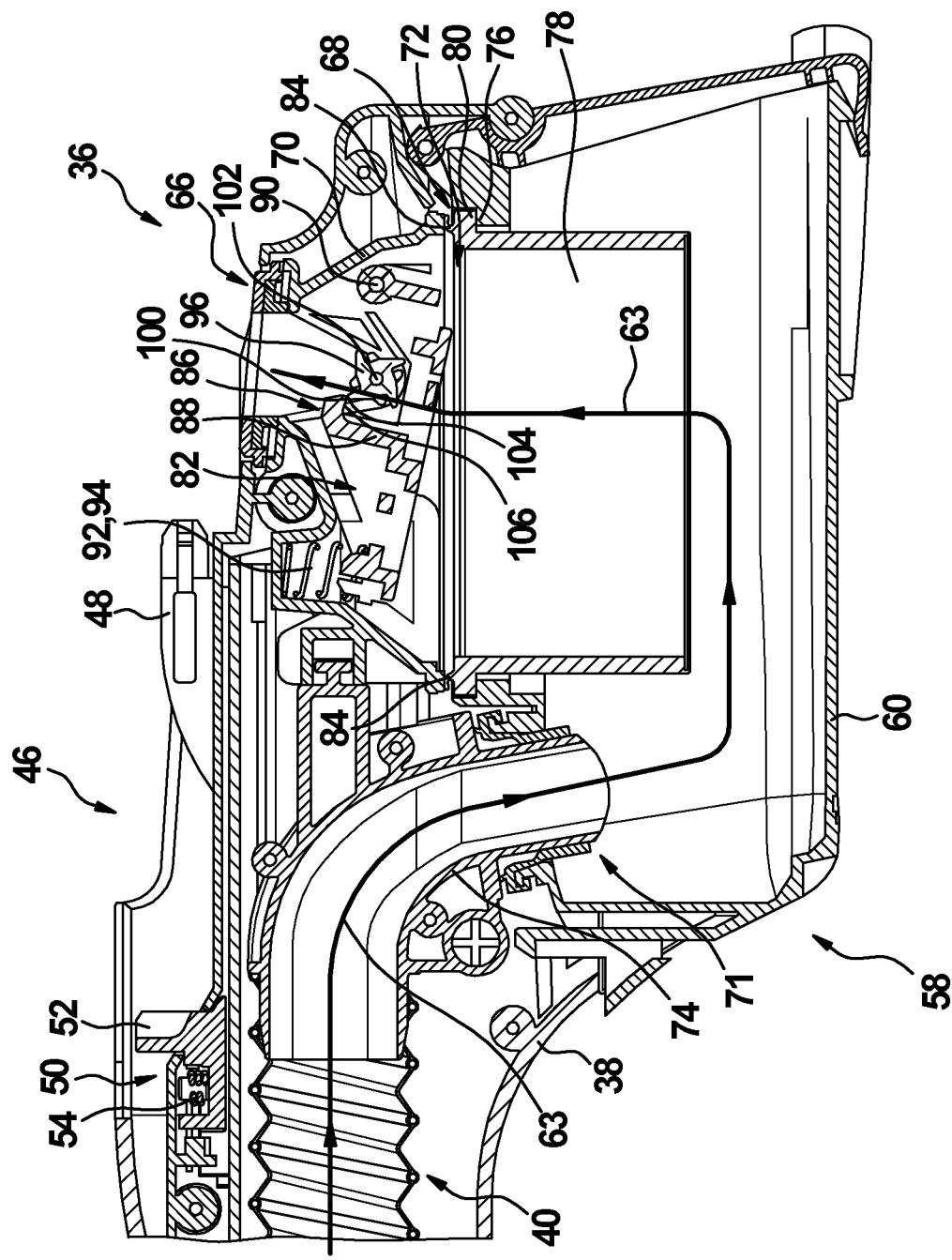
FIG. 2*b* shows a partial longitudinal section of the dust extraction device, wherein a filter-cleaning unit is in a tensioned position.
Figure 2C:
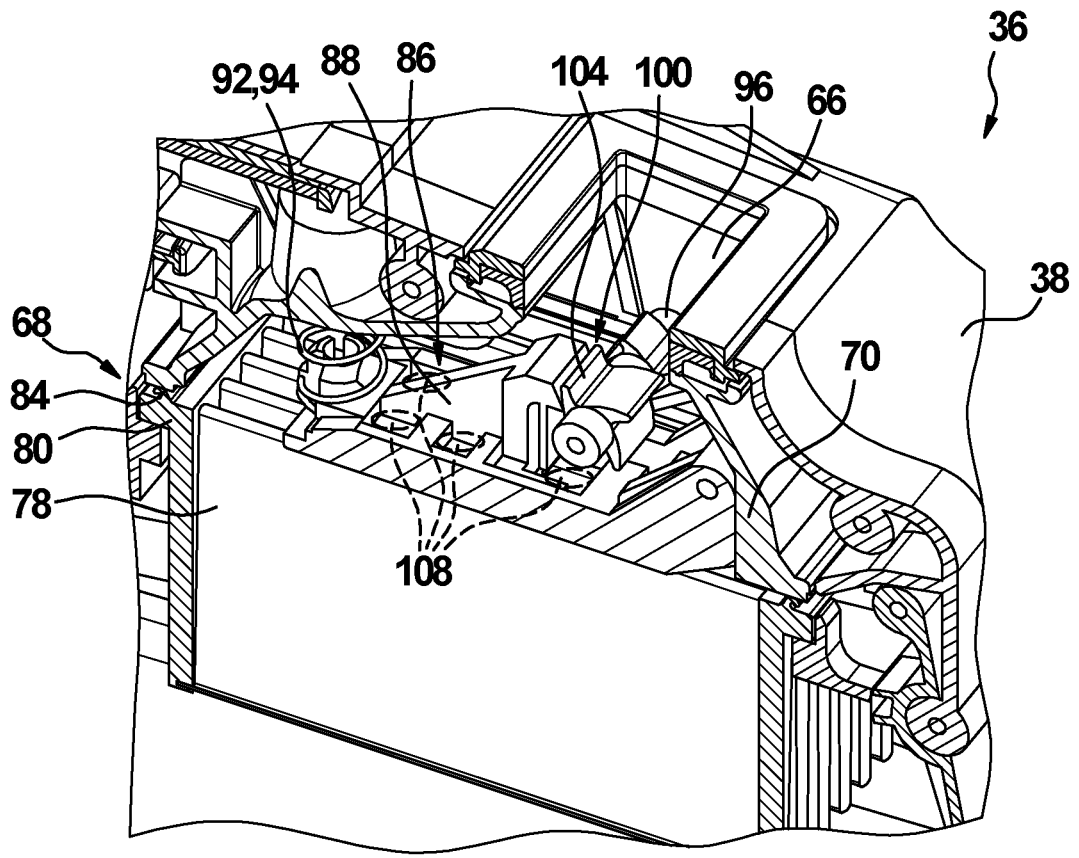
FIG. 2*c* shows a perspective partial view of the dust extraction device.

The filter-cleaning unit 86 is shown in an inoperative position in FIG. 2*a* and in a tensioned position in FIG. 2*b*. FIG. 2*c* shows the filter-cleaning unit 86 in a perspective partial section. The filter-cleaning unit 86 has an impact element 88 which is designed to act upon the filter unit 68 directly with an impact-like force. The impact element 88 is composed of a plastic, in particular a hard plastic. The impact element 88 is arranged completely in the air-directing region 82. The impact element 88 lies against the filter unit 68, in particular against the filter element 78 of the filter unit 68. The impact element 88 is mounted moveably, in particular pivotably, about a movement axis 90, in the housing 38 of the dust extraction device 36.

The filter-cleaning unit 86 also has a resetting element 92 which is designed by way of example as a spring element 94. The spring element 94 is designed by way of example as a compression spring. The spring element 94 acts upon the impact element 88 with a force in the direction of the filter unit 68. In particular, the spring element 94 is supported on one side on the air-directing element 70 and on the other side on the impact element 88. The spring element 94 is preferably supported on a side of the spring element 88 opposite the movement axis 90, in order to produce as large a dynamic effect as possible.

The impact element 88 is manually actuable. For this purpose, the impact element 88 is coupled mechanically to an actuating element 96. The actuating element 96 has an operator control surface 98 via which the actuating element 96 can be operated by a user, and a coupling region 100 via which the actuating element 96 is connectable to the impact element 88.

The operator control surface 98 is arranged in such a manner that the operator control surface 98 is actuable from the outside. The operator control surface 98 is arranged in particular outside the housing 38 of the dust extraction device 36. The actuating element 96 is designed in the form of a rotary wheel in the region of the operator control surface 98 and is rotatable about an actuating axis 102 by means of the operator control surface 98.

The coupling region 100 is arranged within the housing 38 of the dust extraction device 36, in particular within the air-directing region 82. The actuating element 96 is designed in the form of a gear wheel in the coupling region 100. By way of example, the actuating element 96 has four teeth 104 in the circumferential direction in the coupling region 100, between which teeth a respective gap is arranged.

In the inoperative position of the filter-cleaning unit 86 that is shown in FIG. 2*a*, the impact element 88 is not in engagement with the actuating element 96. In particular, a stop 106 of the impact element 88 is arranged in the gap between two teeth 104 of the coupling region 100. By means of manual actuation of the actuating element 96, the actuating element 96 is rotated about the actuating axis 102 until one of the teeth 104 comes to lie against the stop 106 of the impact element 88. By further rotation of the actuating element 96, a force is now transmitted to the impact element 88 which is moved or pivoted from its inoperative position into a tensioned position. The movement or the pivoting of the impact element 88 takes place counter to the resetting force of the resetting element 92. FIG. 2*b* shows the impact element in the tensioned position, with one of the teeth 104 lying at its apex point against the stop 106 of the impact element 88. If the actuating element 96 is rotated further, the tooth 104 of the actuating element 96 and the stop 106 of the impact element 88 come out of engagement and the impact element 88 is accelerated in the direction of the filter unit 68 by the resetting force of the resetting element 92, with the impact element 88 acting upon the filter unit 68, in particular the filter element 78, directly with an impact-like force. In an advantageous manner, the impact-like force releases dust which has solidified on the filter element 78 and the filter-cleaning force of the filter-cleaning unit 86 is at least partially regenerated.

In addition, FIG. 2*c* shows that the impact element 88 has air transport channels 108 by means of which the air stream can pass through the impact element 88. The air transport channels are designed as recesses which extend in particular in the direction of flow through the impact element 88.

Figure 3:
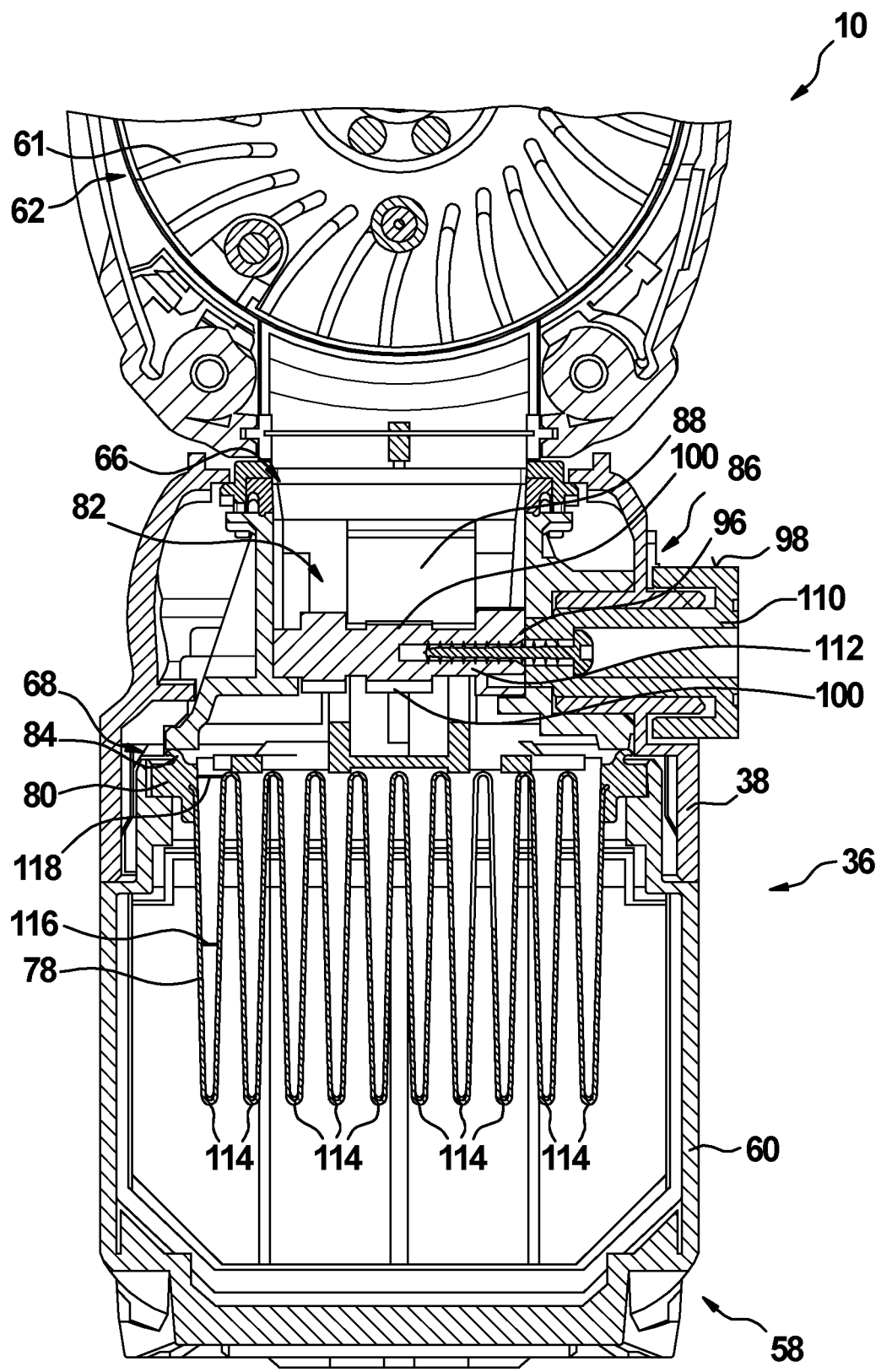
FIG. 3 shows a cross section through the system according to FIG. 1.

FIG. 3 shows a cross section through the system consisting of the hand-held power tool 10 and the dust extraction device 36 in the connected state. In the air channel 63, the air stream out of the dust-collecting chamber 58 is conducted through the filter unit 68 and is subsequently conducted through the air-directing region 82 to the output opening 66. Immediately downstream of the output opening 66 the air stream enters the housing 12 of the hand-held power tool 10 via the air inlet 67 of the hand-held power tool 10 and is sucked up in the direction of the fan 61 of the blower unit 62.

The actuating element 96 consists of a first actuating element part 110 and a second actuating element part 112 which are connected to each other via a screw connection. The first actuating element part 110 has the operator control surface 98 and the second actuating element part 112 has the coupling region 100. In this embodiment, the operator control surface 98 is formed on one side and is therefore accessible to the user only from one side of the housing 38 of the dust extraction device 36. The operator control surface 98 of the actuating element 96 is preferably arranged on that side of the system on which the operating mode switches 32 and/or the direction of rotation switch 34 of the hand-held power tool 10 are also arranged. However, it is also conceivable for the actuating element 96 to have a second operator control surface 98 which is arranged on the side opposite the first operator control surface 98.

The filter element 78 has by way of example ten filter pockets 114 which are formed triangularly. The filter pockets 114 are formed triangularly in particular in such a manner that the filter pockets have a peak width at half-height 116 which corresponds at most to 85% of a maximum width 118 of the filter pocket 114, preferably at most to 70% of the maximum width 118 of the filter pockets 114. In the embodiment shown, the peak width at half-height 116 corresponds substantially to 60% of the maximum width 118 of the filter pocket 114.

Figure 4:
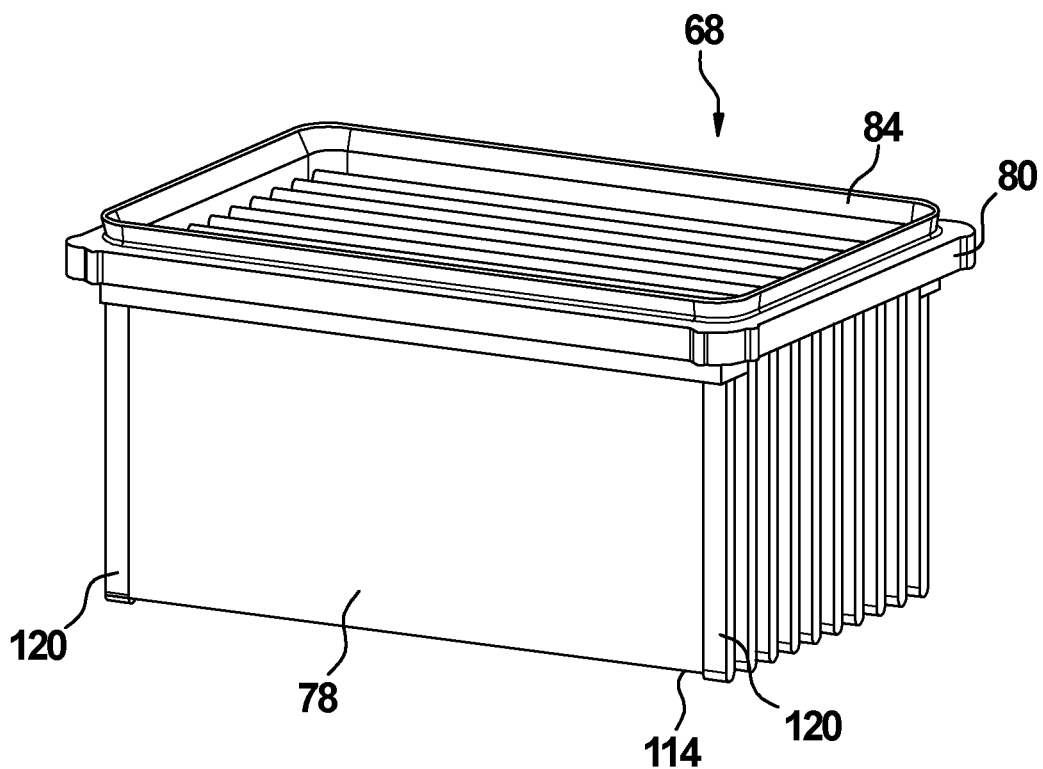
FIG. 4 shows a perspective view of a filter unit of the dust extraction device.

FIG. 4 shows a perspective view of the filter unit 68. The filter frame 80 at least partially has a rectangular shape. The filter frame 80 is composed of a plastic, in particular of a soft plastics material. The filter unit 68 has two closure elements 120 per filter pocket 114, said closure elements closing the filter pockets 114 laterally. The closure elements 120 are composed of the same material as the filter frame 80. The filter frame 80, the closure elements 120 and the sealing element 84 of the filter unit 68 are preferably formed as one piece. As a result, the filter unit 68 can advantageously be produced by insert molding of the filter element 78 with the filter frame 80, the closure elements 120 and the sealing element 84.

Figure 5:
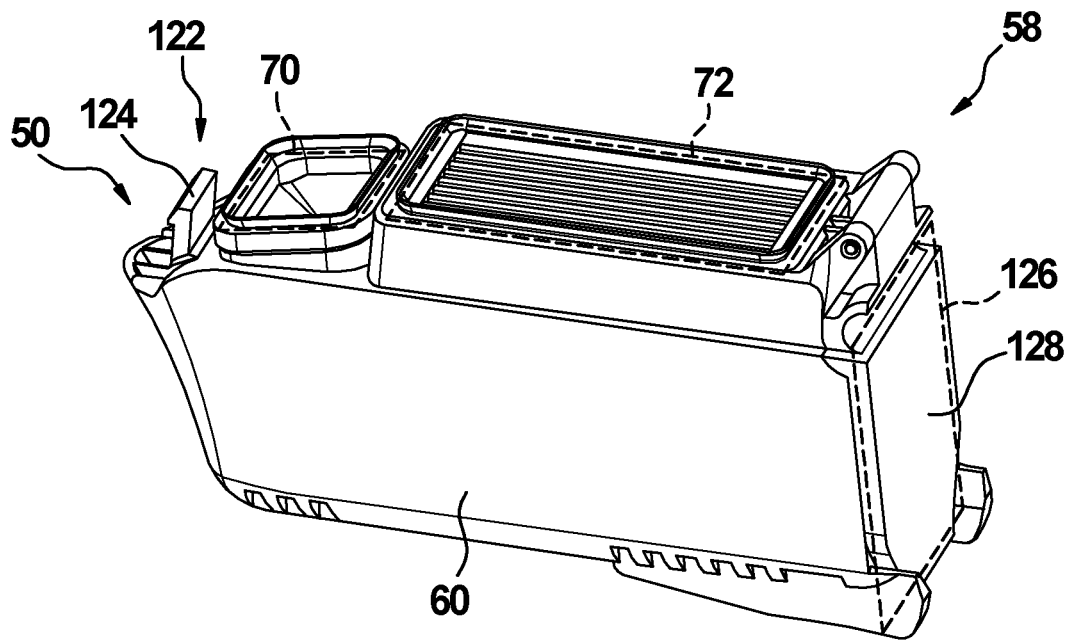
FIG. 5 shows a perspective view of a dust-collecting chamber of the dust extraction device.

FIG. 5 shows a perspective view of the dust-collecting chamber 58 in the state released from the dust extraction device 36. The connection of the dust-collecting chamber 58, in particular of the dust-collecting-chamber housing 60, to the dust extraction device 36, in particular to the housing 38 of the dust extraction device 36, takes place by way of example via a latching unit 122 which comprises a resilient latching arm 124. In addition to the input 71 and the output 72, via which the air stream passes through the dust-collecting chamber 58 during the operation, the dust-collecting chamber 58 additionally has an emptying opening 126 via which the dust-collecting chamber 58 can be emptied. The dust-collecting chamber 58 has an emptying flap 128 which is mounted pivotably on the dust-collecting-chamber housing 60. The emptying opening 126 is closeable via the emptying flap 128.

Figure 6:
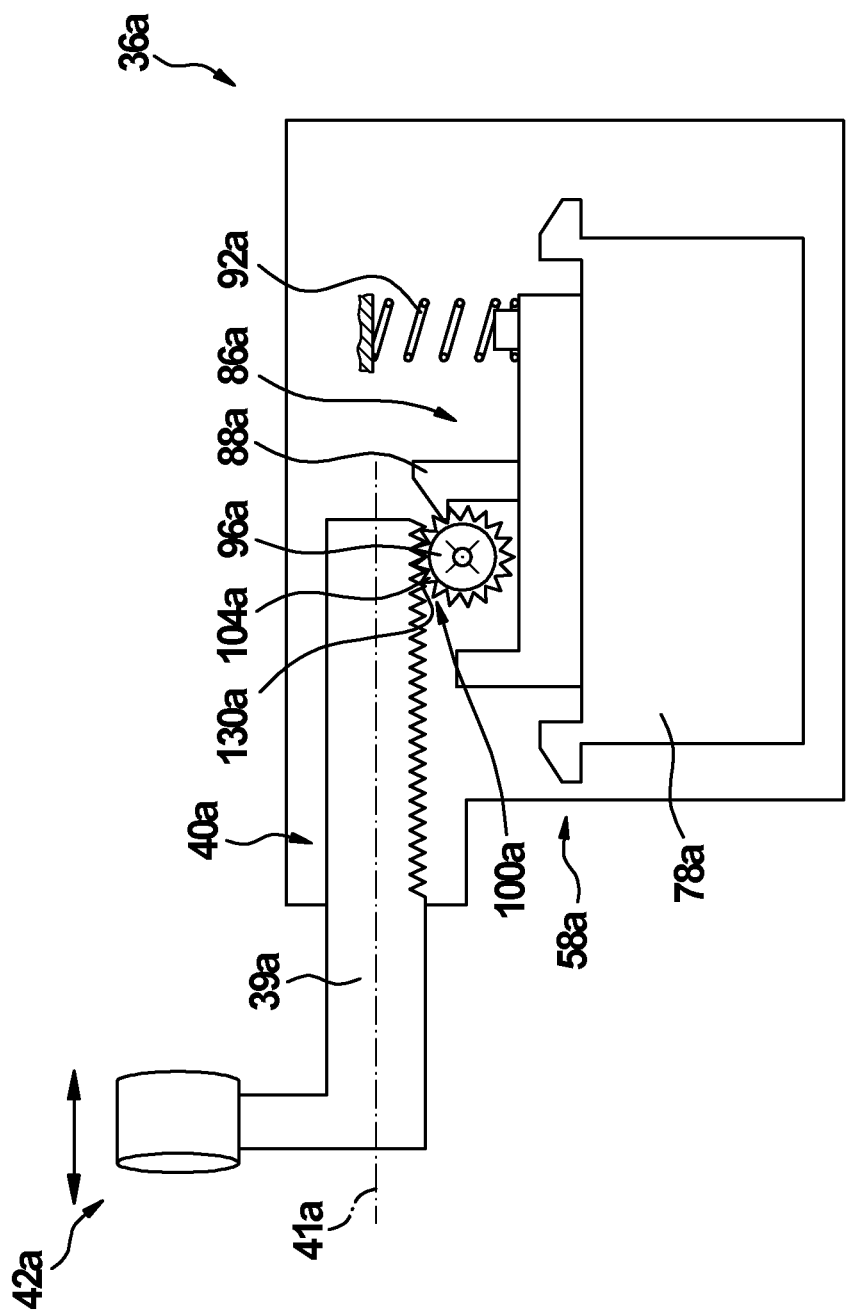
FIG. 6 shows an alternative embodiment of the dust extraction device.

FIG. 6 shows an alternative embodiment of the dust extraction device 36 in a schematic view. The dust extraction device 36a differs from the previously shown embodiment in particular by the manner of actuating the filter-cleaning unit 86a. In particular, the filter-cleaning unit 86a is designed in such a manner that the actuating element 96a is actuable automatically.

The actuating element 96a of the filter-cleaning unit 86a has coupling region 100a in which the actuating element 96a is designed in the form of a gear wheel. In particular, the actuating element 96a has a multiplicity of teeth 104a in the coupling region 100a. The teeth 104a of the actuating element 96a are partially in engagement with a corresponding toothing 130a which is arranged on the telescopic unit 40a, in particular on the telescopic tube 39a. If, during the operation of the dust extraction device 36a, the telescopic unit 40a is moved along the telescopic axis 41a by action upon a workpiece with the suction head 42a, the actuating element 96a is actuated automatically. The actuating element 96a is in turn coupled at least mechanically to the impact element 88a which, in its inoperative position, lies against the filter unit 68a and, by means of the movement of the telescopic unit 40a, is moved counter to a resetting force of a resetting element 92a. In the transition between two teeth 104a of the actuating element 96a, the impact element 88a, as already described previously, acts upon the filter unit 68a directly with an impact-like force.

In addition, it is also conceivable for the actuating element 96a to have an operator control surface 98a which is operable by a user. Manual and automatic actuation of the actuating element 96a can advantageously thereby be realized.

Figure 7:
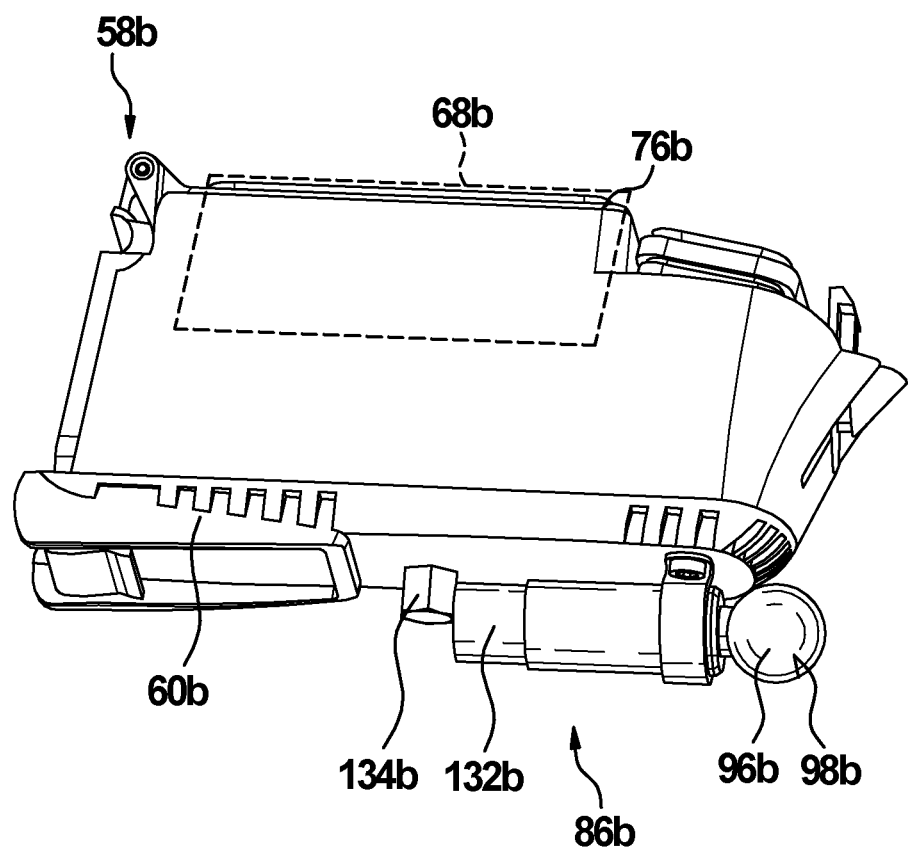
FIG. 7 shows a further alternative embodiment of the dust extraction device.

FIG. 7 shows a further embodiment of the filter-cleaning unit 86. In contrast to the previous exemplary embodiments, the filter-cleaning unit 86b is designed in such a manner that an impact-like force acts indirectly on the filter unit 68b.

The filter-cleaning unit 86b is arranged by way of example on the dust-collecting-chamber housing 60b of the dust-collecting chamber 58b. The dust-collecting chamber 58b substantially corresponds to the dust-collecting chamber 58 according to FIG. 5. The filter unit 68b is connected releasably to the dust-collecting-chamber housing 60b via the filter holder 76b. The filter holder 76b is arranged on an upper side of the dust-collecting chamber 58b. The filter-cleaning unit 86b is arranged on a lower side of the dust-collecting chamber 58b, in particular on an outer wall of the dust-collecting-chamber housing 60b.

The filter-cleaning unit 86b has an impact element 132b mounted in a linearly movable manner. The impact element 132b is composed, for example, of a metallic material, in particular of stainless steel. The impact element 132b is coupled mechanically to an actuating element 96b which has a spherical operator control surface 98b. The impact element 132b is designed to be movable out of its inoperative position counter to a resetting force by pulling of the actuating element 96b. The resetting force is applied by a resetting element (not illustrated specifically) which by way of example can be designed as a spring element. If the actuating element 96b is released, the impact element 132b carries out an impact-like movement until it transfers the impact-like force at a stop 134b to the dust-collecting-chamber housing 60b. The stop 134b is by way of example formed metallically. In particular, the stop 134b is designed as a stainless steel nut which is screwed onto the dust-collecting-chamber housing 60b. Alternatively, it would also be conceivable, however, for the stop 134b to be formed integrally with the dust-collecting-chamber housing 60b. In an advantageous manner, by means of the metallic design of the impact element 132b and of the stop 134b, a sufficiently large impact-like force can be produced so that there is high filter-cleaning efficiency even via the indirect action on the filter unit 68b.

The invention claimed is:

1. A dust extraction device for a hand-held power tool, comprising:
   a housing;
   a mechanical interface configured to releasably connect the dust extraction device to the hand-held power tool;
   a filter unit having a filter element formed of a filter material that filters dust;
   a dust-collecting chamber connected to the filter unit; and
   a filter-cleaning unit including an impact member mounted moveably in and/or on the housing of the dust extraction device, the impact member configured to act directly upon the filter material in a contact region with an impact-like force, wherein:
   the dust extraction device includes an air inlet and an air outlet, and an airflow path is defined from the air inlet to the air outlet, and
   the impact member has at least one air transport channel through which the airflow path passes.

2. The dust extraction device according to claim 1, wherein the filter-cleaning unit comprises a resetting spring that acts upon the impact member with a force in a direction toward the filter unit.

3. The dust extraction device according to claim 1, wherein the filter-cleaning unit comprises an actuating member that is mechanically coupled to the impact member and configured for actuation of the impact member.

4. The dust extraction device according to claim 3, wherein an actuating axis of the actuating member and a movement axis of the impact member are parallel to and spaced apart from one another.

5. A dust extraction device for a hand-held power tool, comprising:
   a housing;
   a mechanical interface configured to releasably connect the dust extraction device to the hand-held power tool;
   a filter unit having a filter element formed of a filter material that filters dust;
   a dust-collecting chamber connected to the filter unit; and
   a filter-cleaning unit including an impact member mounted moveably in and/or on the housing of the dust extraction device, the impact member configured to act directly upon the filter material in a contact region with an impact-like force,
   wherein the filter-cleaning unit comprises an actuating member that is mechanically coupled to the impact member and configured for actuation of the impact member,
   wherein an actuating axis of the actuating member and a movement axis of the impact member are parallel to and spaced apart from one another, and
   wherein the actuating member includes a plurality of teeth arranged circumferentially around the actuating member, the plurality of teeth configured to engage a stop of the impact member and, upon actuation of the actuating member, disengage from the stop such that the force of a resetting spring biases the impact member into contact with the filter unit.

6. The dust extraction device according to claim 5, wherein the impact member is arranged between the filter unit and the resetting spring.

7. The dust extraction device according to claim 5, wherein the actuating member is configured for manual actuation and has an operator control surface.

8. The dust extraction device according to claim 7, wherein the operator control surface is arranged on a lateral side of the housing.

9. The dust extraction device according to claim 5, wherein the actuating member is actuated automatically.

10. The dust extraction device according to claim 9, wherein the actuating member is configured such that the actuating member is automatically actuated during connection of the dust extraction device to the hand-held power tool.

11. The dust extraction device according to claim 9, wherein the actuating member is configured such that the actuating member is automatically actuated during a drilling operation of the hand-held power tool.

12. The dust extraction device according to claim 5, wherein the filter unit comprises a filter frame configured to connect the filter unit to the dust-collecting chamber.

13. The dust extraction device according to claim 5, wherein the filter element includes filter pockets that are triangularly shaped.

14. The dust extraction device according to claim 5, wherein:
   the filter unit comprises an elastic sealing element arranged between the filter unit and at least one of the dust-collecting chamber and the housing of the dust extraction device, and
   the sealing element is compressed in a mounted state of the filter unit.

15. The dust extraction device according to claim 14, wherein:
   the filter unit comprises a filter frame configured to connect the filter unit to the dust-collecting chamber, and
   the sealing element and the filter frame are formed in one piece.

* * * * *